United States Patent
Bakker et al.

(10) Patent No.: US 6,673,327 B1
(45) Date of Patent: Jan. 6, 2004

(54) METHOD FOR THE SELECTIVE OXIDATION OF CARBON MONOXIDE IN HYDROGEN-CONTAINING GASES

(75) Inventors: Dianna Fokelina Bakker, Anna Paulowna (NL); Michael Johannes Franciscus Maria Verhaak, Alkmaar (NL); Paulus Johannes De Wild, Alkmaar (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/787,639
(22) PCT Filed: Sep. 21, 1999
(86) PCT No.: PCT/NL99/00584
§ 371 (c)(1), (2), (4) Date: May 23, 2001
(87) PCT Pub. No.: WO00/17097
PCT Pub. Date: Mar. 30, 2000

(30) Foreign Application Priority Data

Sep. 21, 1998 (NL) .............................................. 1010140

(51) Int. Cl.⁷ .............................................. C01B 31/18
(52) U.S. Cl. ..................................................... 423/247
(58) Field of Search ................................ 423/246, 247

(56) References Cited

U.S. PATENT DOCUMENTS

| | | | |
|---|---|---|---|
| 5,271,916 A | * 12/1993 | Vanderborgh et al. | ....... 423/246 |
| 5,491,120 A | 2/1996 | Voss et al. | ................... 502/304 |
| 6,162,558 A | * 12/2000 | Borup et al. | ................... 429/19 |

FOREIGN PATENT DOCUMENTS

DE      43 34 983 A1    10/1993    ............. C01B/3/54

* cited by examiner

Primary Examiner—Stanley S. Silverman

(57) ABSTRACT

The invention relates to a method for the selective catalytic oxidation of carbonmonoxide (CO) in $H_2$-rich, $CO_2$- and $H_2$-containing gases in the presence of a noble metal catalyst on an alumina carrier with the addition of air as oxidizing agent. According to the invention, with this method $\alpha$-$AL_2O_3$ carrier can be less than 25 m²/gram. The noble metal can be ruthenium or platinum and preferably a combination of ruthenium (Ru) and platinum (Pt), the sum of the quantities of RU and Pt being less than or equal to 1.0% (m/m).

7 Claims, 4 Drawing Sheets

METHOD FOR THE SELECTIVE OXIDATION OF CARBON MONOXIDE IN HYDROGEN-CONTAINING GASES

FIELD OF THE INVENTION

The invention relates to a method for the selective catalytic oxidation of carbon monoxide (CO) in the presence of a noble metal catalyst on an alumina carrier.

BACKGROUND OF THE INVENTION

Fuel cells are being investigated in many places as a possible energy source for driving vehicles and for stationary generation of electricity. The use of fuel cells is still highly dependent on the availability of the fuel: hydrogen ($H_2$). It is not to be expected that an infrastructure for hydrogen will be set up within the foreseeable future. Especially for mobile applications, it is therefore necessary to transport an available fuel, or a fuel that becomes available, and to convert this to hydrogen as the feed for the fuel cell.

A gas mixture that consists mainly of hydrogen and carbon dioxide ($CO_2$) is then produced—for example via steam reforming and/or partial oxidation—from fuels such as methane, LPG, methanol, petrol, diesel and other hydrocarbons. Said gas mixture, which is rich in hydrogen, is then fed to the fuel cell which generates electricity by an electrochemical reaction of hydrogen with oxygen.

However, a certain amount of carbon monoxide (CO) is also always liberated during the conversion of said fuels into hydrogen. For instance, a gas mixture of, for example, 75% (V/V) $H_2$, 24% (V/V) $CO_2$ and 1% (V/V) CO is produced on steam reforming of methanol. A solid polymer fuel cell, the major candidate for transport applications, is extremely sensitive to CO, which even in low concentrations (0.01% (V/V)) has an adverse effect on the performance of the fuel cell. For a usable system it is therefore necessary to remove CO down to the said level and preferably down to a lower level (<0.005% (V/V), 50 ppm). A technically attractive option for removing CO from $H_2$-containing gas streams is by means of selective oxidation of CO to $CO_2$ at low temperature (100° C.–200° C.). In this context it is important that the consumption of hydrogen by non-selective oxidation to water is minimised.

The power of ruthenium (Ru) to catalyse the oxidation of CO is, for example, known from the ammonia synthesis process. Thus, it is known from U.S. Pat. No. 3,216,782 (Nov. 9, 1965) that 0.5% (m/m) Ru on alumina ($Al_2O_3$) is capable of oxidising 0.055–0.6% (V/V) CO in the presence of $H_2$ at between 120° C. and 160° C. to a level of less than 15 ppm. In this case it is necessary that the quantity of oxygen ($O_2$) added is such that the molar $O_2$/CO ratio is between 1 and 2. The excess oxygen which is not needed for the oxidation of CO reacts with hydrogen to give water. It has not been investigated whether this Ru catalyst is also capable of oxidising CO from a typical reformate gas to a CO level of 15 ppm under the same conditions (temperature, $O_2$/CO ratio).

In the Journal of Catalysis 142 (1993), Academic Press Inc., pages 257–259, S. H. Oh and R. M. Sinkevitch describe 0.5% (m/m) Ru/$\gamma$-$Al_2O_3$ as highly effective in the complete oxidation, at low temperature (100° C.), of 900 ppm CO with 800 ppm oxygen ($O_2$) in a gas mixture which also contains 0.85% (V/V) $H_2$, with the remainder being $N_2$. Data on the stability of the Ru catalyst are not given in the article and in addition the behaviour of the catalyst in a realistic reformate gas containing $H_2$, $CO_2$, $H_2O$ and CO in much higher concentrations was not investigated.

European Patent EP 0 743 694 A1 (Nov. 20, 1996) refers to an oxidation unit for the selective oxidation of CO in $H_2$-rich gas at a reaction temperature of between 80° C. and 100° C. A molar ratio of $O_2$/CO of 3 is used. The final CO content is a few ppm. The excess oxygen reacts with hydrogen to give water. The catalyst consists of a 0.2% (m/m)–0.5% (m/m) Pt—Ru alloy on $Al_2O_3$. No examples which would show the stability of the catalyst are given.

U.S. Pat. No. 5,674,460 (Oct. 7, 1997) describes a structured reactor for the catalytic removal of CO from $H_2$-rich gas at between 90° C. and 230° C. Depending on the temperature, the catalyst in this case consists of Pt on $\gamma$-$Al_2O_3$, Pt on zeolite-Y or Ru on $\gamma$-$Al_2O_2$. The invention is explained solely on the basis of 5% (m/m) Pt on $\gamma$-$Al_2O_3$, by means of which the CO content can be reduced to about 40 ppm at a reaction temperature of between 80° C. and 130° C. No stability data are given in this patent either.

In the Journal of Catalysis 168 (1997), Academic Press, pages 125–127, R. M. Torres Sanchez et al. describe gold on manganese oxide as an alternative catalyst for the oxidation of CO in $H_2$ at low temperatures (approximately 50° C.). In particular the price, due to the high gold loading (approximately 4–10% (m/m)), makes the use of this type of, catalyst less interesting. Moreover, this type of catalyst is able to withstand carbon dioxide to only a limited extent.

It is not clear from the above whether the catalysts of the prior art are suitable for the selective oxidation of CO in $H_2$-rich reformate gas mixtures where there is high activity in conjunction with good stability in the temperature range 100° C.–200° C. and where a low oxygen excess can be used to minimise the hydrogen consumption.

SUMMARY OF THE INVENTION

The invention relates to a method for the selective catalytic oxidation of carbon monoxide (CO) comprising catalytically oxidizing carbon monoxide in $H_2$-rich, $CO_2$- and $H_2O$-containing gases in the presence of a noble metal catalyst on an $\alpha$-$Al_2O_3$ carrier with the addition of air as oxidizing agent.

DETAILED DESCRIPTION OF THE INVENTION

One aim of the present invention is to provide a method for the selective catalytic oxidation of CO from $H_2$-rich, $CO_2$- and $H_2O$-containing (reformate) gas mixtures, making use of as small as possible an amount of oxygen and at relatively low temperature. A further aim of the present invention is to provide a catalyst which has high chemical and thermal stability and can be produced in a cost-effective manner by means of a simple method of preparation from commercially available starting materials and a low noble metal loading.

The use of commercially available $\alpha$-$Al_2O_3$ as carrier material in the preparation of 0.5% (m/m) Ru on $Al_2O_3$ led, surprisingly, to a catalyst which in the temperature range about 120° C. about 160° C. combines high activity (>99% conversion of CO) with high stability (a CO conversion of at least 97% for a period of at least 50 hours) in the oxidation of CO with a relatively small excess of oxygen in dilute reformate gas. These results were found to be appreciably better than the results which were obtained with a commercially available 0.5% (m/m) ruthenium catalyst with $\gamma$-$Al_2O_3$ as the carrier (specific surface area >100 m$^2$/g), which is representative of the catalysts used in the abovementioned studies and reflects the prior art.

It has also been found that the addition of Pt and the lowering of the total noble metal loading resulted in a catalyst which showed even better stability for the selective oxidation of CO in both dilute and undiluted reformate gas (a CO conversion of at least 99% for a period of at least 50 hours).

It has furthermore been found that in particular the nature and the specific surface area of the $Al_2O_3$ carrier used are the factors determining the exceptional performance of the Ru and Ru—Pt catalysts according to the present invention. Preferably, alumina is used in the form of $\alpha$-$Al_2O_3$. A highly active and stable catalyst i formed when the specific surface area of the $\alpha$-$Al_2O_3$ is in the range from about 3 $m^2$/gram to 25 $m^2$/gram.

The catalysts in the present invention can be prepared in a simple manner via a standard impregnation method from commercially available starting materials. Compared with the current state of the art, the method according to the present invention has the following advantages:

complete oxidation of CO to $CO_2$ in the temperature range about 120° C. about 160° C. with only a small excess of oxygen ($O_2$/CO=1) compared with the stoichiometrically required quantity of oxygen ($O_2$/CO= 0.5), minimal hydrogen consumption as a result of low oxygen excess ($O_2$/CO 1), stable action at 130° C. in simulated reformate gas (0.5% (V/V) CO, 0.5% (V/V) $O_2$, 74% (V/V) $H_2$, 19% (V/V) $CO_2$ and 6% (V/V) $H_2O$) for a period of at least 50 hours (residual quantity of CO <50 ppm), low noble metal loading of less than about 0.5% (m/m).

$\alpha$-$Al_2O_3$ is a commercial product that is used, inter alia, in the electronics industry in the production of thick and thin substrate layers by tape casting. Another application is the production of industrial ceramics.

The use of this $\alpha$-$Al_2O_3$ as carrier for a selective oxidation catalyst for CO in $H_2$-rich gas mixtures has not been described before.

DETAILED DESCRIPTION OF THE FIGURES

Figure 1:
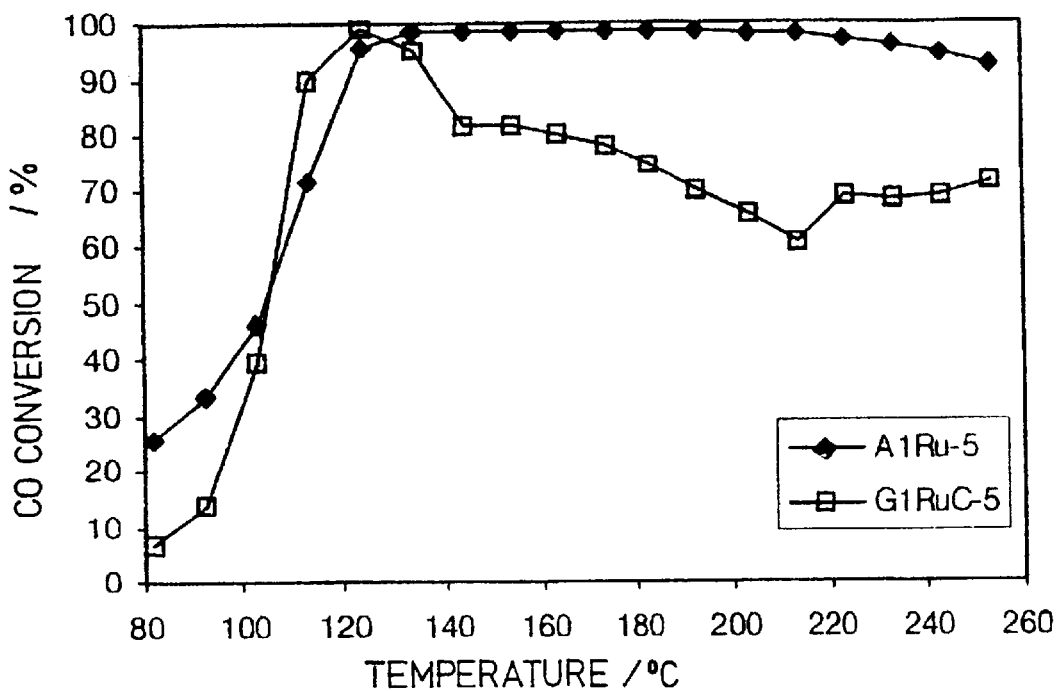
FIG. 1 shows the activity of a 0.5% (m/m) Ru-on-$\alpha$-$Al_2O_3$ catalyst (code A1Ru-5) compared with the activity of a commercial Ru catalyst with 0.5% (m/m) Ru on $\gamma$-$Al_2O_3$ (code G1RuC-5) in the oxidation of CO in dilute reformate gas.

The invention will be illustrated in more detail on the basis of the following examples together with the figures. The examples should not be construed to limit the scope of the invention.

In the following tests the Ru-on-$\alpha$-$Al_2O_3$ and the Ru—Pt-on-$\alpha$-$Al_2O_3$ catalysts were prepared by impregnation of a commercial $\alpha$-$Al_2O_3$ carrier with solutions of the salts ruthenium nitrosylnitrate and hexachloroplatinic acid. The effect of the $\alpha$-$Al_2O_3$ carrier on the CO oxidation activity and stability of the catalyst is determined under III below. The effect of the addition of Pt and the lowering of the total noble metal loading on the catalyst activity and stability is given under IV. Finally, the activity and the stability of the catalyst as a function of the composition of the reformate gas are determined under V.

I. Preparation of Ru-on-$\alpha$-$Al_2O_3$ and Ru—Pt-on-$\alpha$-$Al_2O_3$ Catalysts The catalysts according to the present invention were prepared by dry impregnation of $\alpha$-$Al_2O_3$ powder with solutions of ruthenium nitrosylnitrate ($(Ru(NO)(NO_3)_x$ $(OH)_y$ (x+y=3), Ru content of the solution 1.5% (m/m)) and hexachloroplatinic acid ($H_2PtCl_6 \cdot xH_2O$), Pt content 0.5% (m/m)).

The 0.5% (m/m) Ru-on-$\alpha$-$Al_2O_3$ catalyst (code A1Ru-5) was prepared by adding 5 gram of the Ru solution to 15 gram of the $\alpha$-$Al_2O_3$ powder in a glass beaker and then stirring well until a pasty substance was formed. This paste was then dried in air in an oven for 16 hours at 80° C. During drying the setting paste was stirred several times. After drying, the solid material was finely ground to a homogeneous powder with the aid of a mortar. The powder thus produced was then pressed to give a pill. After crushing the pill in a mortar a 0.25 mm to 0.5 mm sieve fraction was prepared for the catalytic measurements. The catalyst prepared was stored in a polyethene sample bottle at room temperature.

In the case of the 0.25% (m/m) Ru and 0.125% (m/m) Pt-on-$\alpha$-$Al_2O_3$ catalysts (codes A1RuPt-48 and A2RuPt-48), first 1.68 gram of the Ru solution and then 2.51 gram of the Pt solution were added to 10 gram of the $\alpha$-$Al_2O_3$ powder. The subsequent preparation steps were identical to those described above for A1Ru-5.

II. Test Apparatus and Test Procedure

The conversion of CO was studied in an automated micro-flow set-up operating under atmospheric pressure. The following gases were available to the set-up: $N_2$, $O_2$, $H_2$, $CO_2$, CO and $H_2O$. It was possible to measure the gases $H_2$, $CO_2$ and CO with the aid of a Perkin-Elmer model 8500 gas chromatograph equipped with a methanizer, connected in series, a TCD and an FID. A pneumatically controlled 6-way tap was used for sampling the product gas. CO was also measured occasionally with an Elsag Bailey Hartmann & Braun model URAS 10E ND-IR analyser.

The precursor was contained in a Pyrex glass reactor having an internal diameter of 10 mm. The catalyst bed was covered with glass wool and a layer of glass beads. The height of the catalyst bed was approximately 5 mm, whilst the gas flow was approximately 75 ml/min. The space velocity (SV) was approximately 11,000 $h^{-1}$ in this case. The amount of precursor required (0.25 mm–0.5 mm fraction) was 200 or 400 mg. The temperature was measured immediately below the catalyst bed using a CrAl thermocouple.

During the measurements the catalyst sample was exposed to a pre-mixed gas containing 0.5% (V/V) CO, 0.5% (V/V) $O_2$, 5 or 19% (V/V) $CO_2$, 15, 51 or 74% (V/V) $H_2$, 6 or 7% (V/V) $H_2O$, with the remainder being $N_2$. Prior to the CO oxidation measurement the catalyst sample was pre-treated with, successively, air at 400° C. and 25% (V/V) $H_2$ in $N_2$ at 550° C. for activation. The activated catalyst was then cooled under $H_2/N_2$ to the starting temperature for the test. The reactor was flushed with $N_2$ for approximately 10 minutes each time the gas composition was changed. For activity measurements the starting temperature was always 80° C., after which the reactor temperature was raised in 10° C. steps to a final temperature of 250° C. The CO conversion was determined at each temperature. For stability measurements the catalyst bed was first brought to the measurement temperature under $H_2/N_2$ after the pretreatment, after which the CO conversion was determined once an hour for a period of 50 hours. The general test conditions for the CO oxidation measurements are given in Table 1.

The CO conversion was calculated on the basis of the amount of CO in the product gas ($CO_{out}$) using the GC and the amount of CO in the feed gas ($CO_{in}$=0.5% (V/V)) determined using the GC in accordance with: CO conversion (in %)=100∗($CO_{in}$—$CO_{out}$)/$CO_{in}$. Using the NDIR it was separately determined that the detection limit of the GC for CO was approximately 25–30 ppm.

TABLE 1

| General test conditions | |
|---|---|
| Weight of catalyst sample | 200–400 mg |
| Volume of catalyst bed | approx. 0.4–0.6 ml |
| Particle size | 0.25–0.50 mm |
| Gas flow rate | 75 ml/min |
| Spatial velocity of the gas per hour (GHSV) | 10,000–15,000 h$^{-1}$ |
| Feed gases | |
| Reformate gas 1 | 0.5% CO, 0.5% $O_2$, 15% $H_2$, 5% $CO_2$, 7% $H_2O$, remainder $N_2$ |
| Reformate gas 2 | 0.5% CO, 0.5% $O_2$, 51% $H_2$, 5% $CO_2$, 7% $H_2O$, remainder $N_2$ |
| Reformate gas 3 | 0.5% CO, 0.5% $O_2$, 74% $H_2$, 19% $CO_2$, 6% $H_2O$ |
| Total pressure | atmospheric |
| Temperature of catalyst bed | 80° C.–250° C. (10° C. steps in the activity measurements) 130° C. (stability measurements) |

III. Effect of α-$Al_2O_3$ Carrier on CO Oxidation in Dilute Reformate Gas

The test results for the oxidation of CO with $O_2$ in dilute reformate gas (gas 1) over the Ru-on-alumina catalyst (code A1Ru-5) show that the use of α-$Al_2O_3$ as the carrier for Ru results in both a better activity and a better stability in the oxidation of CO compared with a commercial Ru-on-γ-$Al_2O_3$ catalyst (code G1RuC-5).

FIG. 1 shows the activity of A1Ru-5 compared with the activity of G1RuC-5 in the oxidation of CO in dilute reformate gas 1. Catalyst A1Ru-5 achieves a more complete CO conversion over a wider temperature range than does G1RuC-5.

Figure 2:
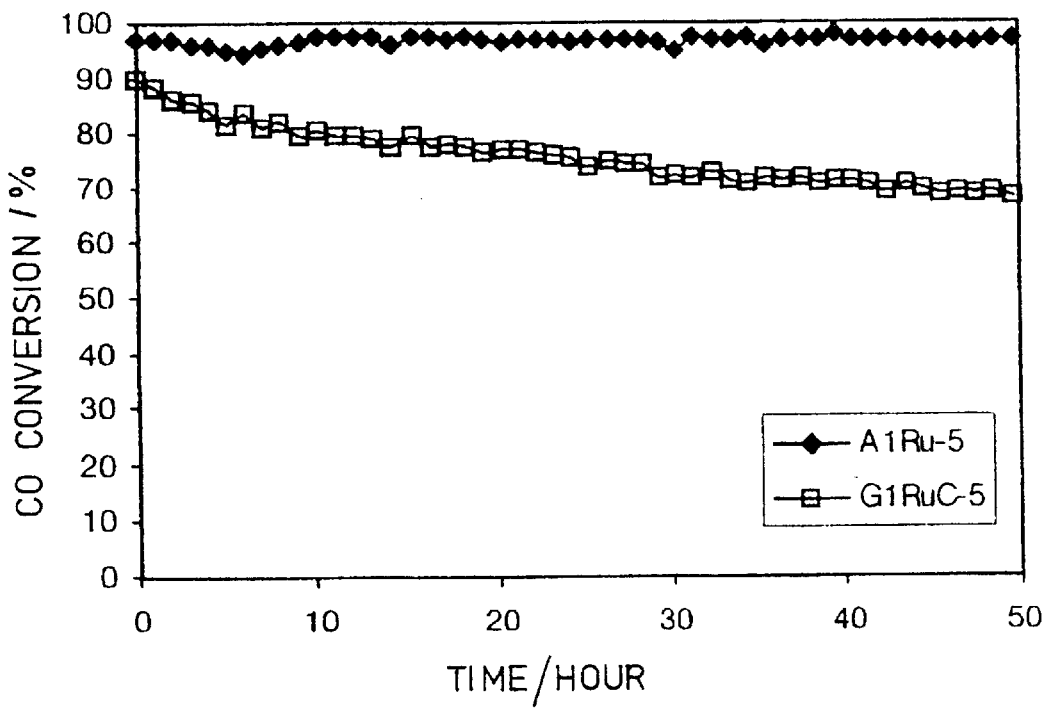
FIG. 2 shows the stability of A1Ru-5 in the CO oxidation at 130° C. compared with the stability of G1RuC-5 in dilute reformate gas.

FIG. 2 shows the stability in the CO oxidation in dilute reformate gas 1 with A1Ru-5 compared with the stability of G1RuC-5. A1Ru-5 is found to be both more active and more stable in the CO oxidation than G1RuC-5 over a measurement period of 50 hours.

IV. CO Oxidation in Dilute Reformate Gas With Ru—Pt on α-$Al_2O_3$

Test results for the oxidation of CO with $O_2$ in dilute reformate gas 1 over a Ru—Pt-on-α-$Al_2O_3$ catalyst (code A1RuPt-48) demonstrate that the addition of Pt and lowering the total noble metal loading results in a catalyst which is more stable than the A1Ru-5 described above. The addition of platinum and lowering the total noble metal loading was not found to have a significant effect on the activity of the catalyst.

Figure 3:
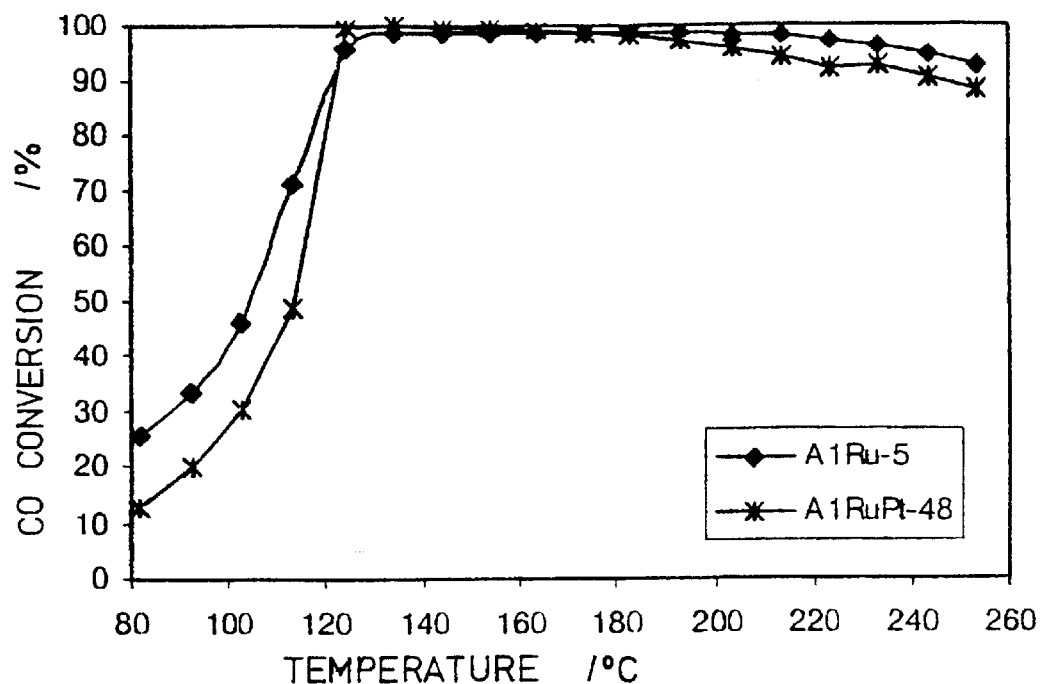
FIG. 3 shows the activity of a 0.25% (m/m) Ru, 0.125% (m/m) Pt-on-$\alpha$-$Al_2O_3$ catalyst (code A1RuPt-48) compared with the activity of A1Ru-5 in the oxidation of CO in dilute reformate gas.

FIG. 3 shows the activity of A1RuPt-48, which has a low loading, compared with the activity of A1Ru-5 in the oxidation of CO in dilute reformate gas 1. It can clearly be seen that from 120° C. A1RuPt-48 shows virtually the same CO conversion as a function of the temperature as A1Ru-5. This is despite the lower noble metal loading of A1RuPt-48 compared with A1Ru-5.

Figure 4:
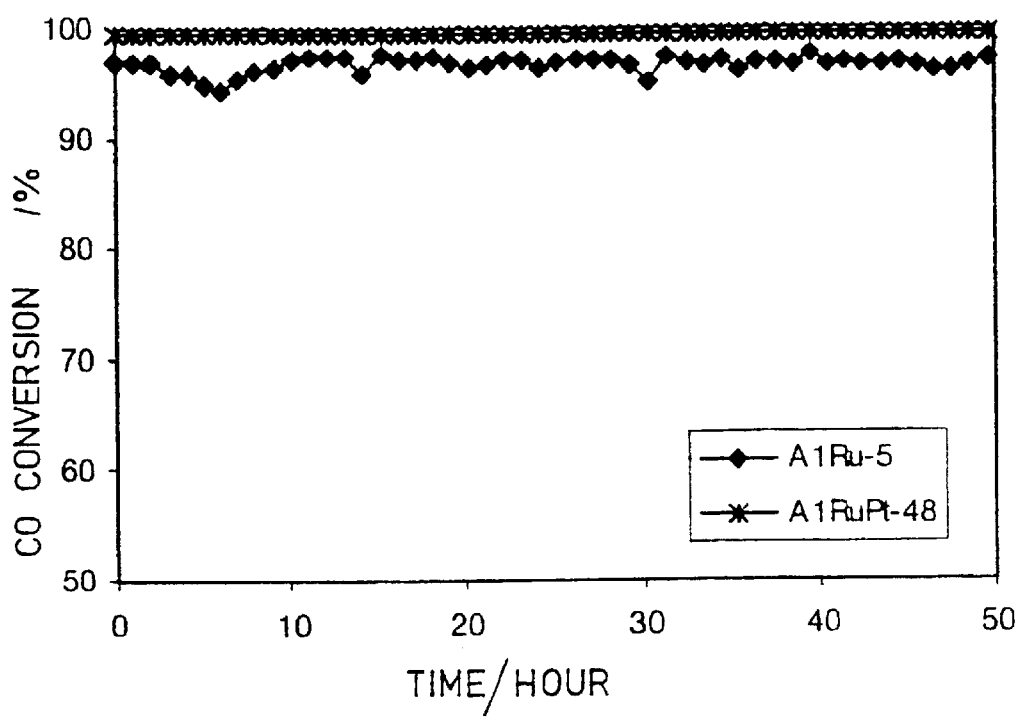
FIG. 4 shows the stability of A1RuPt-48 in the CO oxidation at 130° C. compared with the stability of A1Ru-5 in dilute reformate gas.

FIG. 4 shows the stability of A1RuPt-48 in the CO oxidation at 130° C. compared with the stability of A1Ru-5 in dilute reformate gas 1. A1RuPt-48 displays a higher conversion of CO than A1Ru-5 over the entire measurement period.

V. Effect of Reformate Gas Composition on CO Oxidation With Ru—Pt on α-$Al_2O_3$ Test results for the oxidation of CO with $O_2$ in various reformate gases 1, 2 and 3 over the Ru—Pt-on-α-$Al_2O_3$ catalyst described above show that activity and stability are virtually independent of the composition of the reformate gas.

Figure 5:
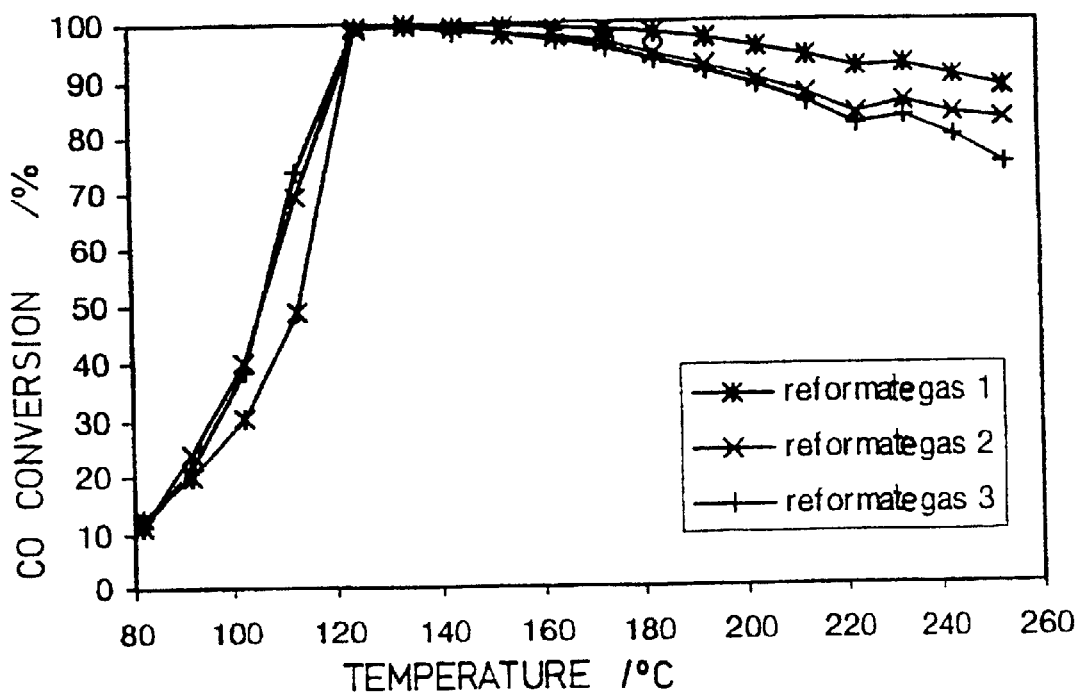
FIG. 5 shows the activity of A1RuPt-48 in the oxidation of CO as a function of the reformate gas composition.

FIG. 5 shows the activity of A1RuPt-48 in the oxidation of CO measured in various reformate gas compositions. Only at the highest temperatures is the conversion of CO in the less dilute reformate gases 2 and 3 somewhat lower than the conversion in the most dilute reformate gas 1.

Figure 6:
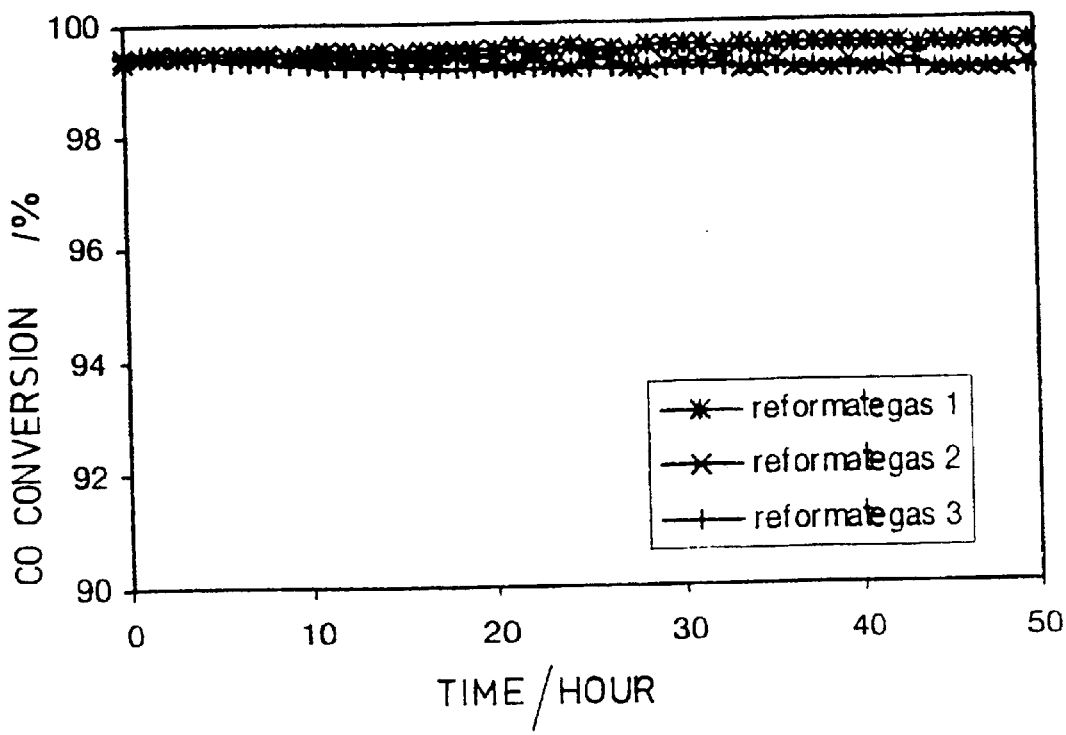
FIG. 6 shows the stability of A1RuPt-48 in the CO oxidation at 130° C. as a function of the reformate gas composition

FIG. 6 shows the stability of A1RuPt-48 in the CO oxidation in the three different reformate gases 1, 2 and 3. The very high CO conversion with this catalyst is dependent to only a very slight extent on the composition of the reformate gas; even with simulated undiluted reformate gas 3 there is more than 99% CO conversion over the entire measurement period (residual quantity of CO <50 ppm).

Figure 7:
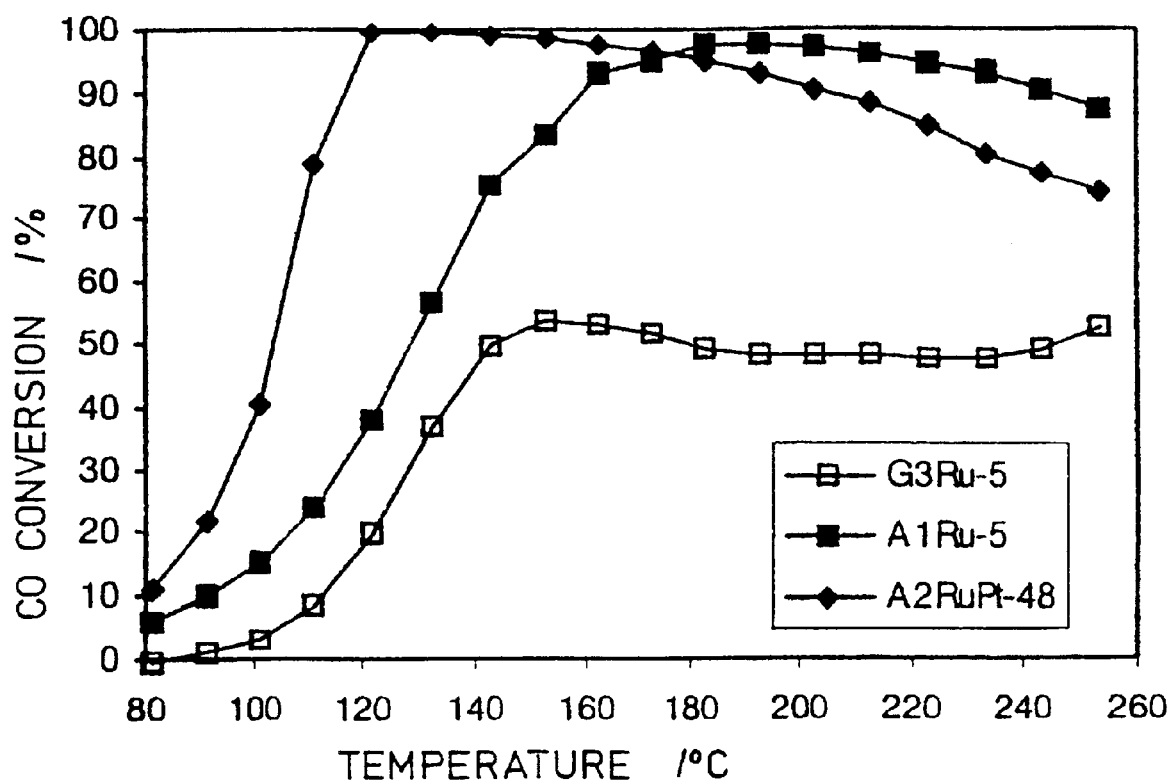
FIG. 7 shows the activity of A2RuPt-48 compared with the activity of A1Ru-5 and G3Ru-5 in the oxidation of CO in undiluted reformate gas.

FIG. 7 shows the activity of three catalysts in the oxidation of CO in undiluted reformate gas 3. The various curves in FIG. 7 for 0.5% (m/m) Ru on γ-$Al_2O_3$ (code G3Ru-5), 0.5% (m/m) Ru on α-$Al_2O_3$ (code A1Ru-5) and 0.25% (m/m) Ru and 0.125% (m/m) Pt on α-$Al_2O_3$ (code A2RuPt-48) show the substantial effect of the type of carrier material (γ compared with α) and the metal composition (Ru compared with Ru/Pt).

What is claimed is:

1. A method for the selective catalytic oxidation of carbon monoxide comprising:

catalytically oxidizing a quantity of carbon monoxide in $H_2$-rich, $CO_2$- and $H_2O$-containing gases in the presence of a noble metal catalyst on an α-$Al_2O_3$ carrier with the addition of a quantity of air as oxidizing agent wherein the noble metal is a mixture of ruthenium and platinum.

2. The method of claim 1 in which the $\alpha$-$Al_2O_3$ carrier further comprises a specific surface area of between about 3 $m^2$/gram and about 25 $m^2$/gram.

3. The method of claim 1 in which the oxidation takes place at a temperature between about 100° C. and about 200° C.

4. The method of claim 3 in which the temperature is maintained via heat exchange.

5. The method of claim 1 in which the quantity of air added corresponds to a quantity of oxygen which in molar terms is about equal to the quantity of carbon monoxide to be oxidized.

6. The method of claim 1 in which the oxidation takes place at a temperature between about 120° C. and about 180° C.

7. The method of claim 1 in which the noble metal comprises a maximum of about 1.0% (m/m).

* * * * *